United States Patent
Akhteruzzaman

(10) Patent No.: US 6,353,668 B1
(45) Date of Patent: Mar. 5, 2002

(54) METHOD FOR OPTIMIZING STABILITY OF A LINE INTERFACE CIRCUIT IN A TELECOMMUNICATIONS NETWORK

(75) Inventor: Akhteruzzaman, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/138,155

(22) Filed: Aug. 21, 1998

(51) Int. Cl.⁷ .......................... H04M 9/00; H04M 1/00; H04M 11/00

(52) U.S. Cl. .................. 379/399.01; 379/93.05; 379/398

(58) Field of Search ................ 379/399.01, 377, 379/387.01, 412, 413, 394, 398, 324, 219, 93.05–93.07

(56) References Cited

U.S. PATENT DOCUMENTS

| | | | |
|---|---|---|---|
| 5,754,644 A | 5/1998 | Akhteruzzaman | 379/413 |
| 5,815,569 A | 9/1998 | Akhteruzzaman | 379/399 |
| 5,822,426 A * | 10/1998 | Rasmus et al. | 379/399 |
| 5,828,748 A | 10/1998 | Akhteruzzaman | 379/399 |
| 6,201,865 B1 * | 3/2001 | Dupuis et al. | 379/399 |

\* cited by examiner

*Primary Examiner*—Wing F. Chan
(74) *Attorney, Agent, or Firm*—Mony Ghose

(57) ABSTRACT

A method for enhancing the stability associated with an individual telecommunications line interface circuit comprises measuring a phase angle between a battery voltage and an output voltage. The phase angle measurement is processed by a digital signal processor for synthesizing a comparator circuit to generate an output voltage if the phase angle is a value other than forty-five degrees (45°). The new output voltage is then applied to the line interface circuit and the phase angle is recalculated to determine if it is a closer approximation of 45°. In an alternative embodiment, a database including a plurality of output voltage and electrical parameter values is stored in the digital signal processor and indexed by measured phase angles between the battery voltage and the output voltage. If a phase angle other than 45° is measured, the measured phase angle is used to obtain a new output voltage and electrical parameters from the database. The new output voltage is generated by the digital signal processor so that the line interface circuit operates at a greater degree of stability.

8 Claims, 3 Drawing Sheets

METHOD FOR OPTIMIZING STABILITY OF A LINE INTERFACE CIRCUIT IN A TELECOMMUNICATIONS NETWORK

TECHNICAL FIELD

This invention relates to line interface circuits deployed in telecommunications networks and, more particularly, to maintaining an optimum stability of such line interface circuits by manipulating phase margins.

BACKGROUND OF THE INVENTION

Line interface circuits interconnect customer premises equipment to central office switches by subscriber lines (commonly referred to as subscriber loops). For administrative purposes, a plurality of line interface circuits are grouped in an integrated services line unit (ISLU). A line interface circuit includes means for delivering current to a subscriber loop via an external power source. In modem line interface circuits, the means for delivering current to the subscriber loop is a battery feed. Voltage generated by the external power source is processed by a switching converter circuit before delivery to the battery feed circuit. The power delivered to the subscriber loop by the battery feed circuit enables a central office switch to detect the presence, and status, of customer premises equipment served by the loop. The battery feed circuit also couples audio signals transmitted by the central office switch to the customer premises equipment and vice versa. Power supplied to the switching converter circuit is processed by a transformer which produces a predetermined battery voltage ($V_{BAT}$). The predetermined battery voltage is established to provide adequate current to interconnect customer premises equipment to a central office switch and to provide high quality voice transmission to the subscriber loop.

It is well known that normal line interface circuit operation results in the dissipation of power due to losses associated with the internal line interface circuit components. U.S. Pat. No. 5,754,644, assigned to Lucent Technologies Inc., addresses issues associated with power losses and is incorporated by reference herein. Although the inefficient operation of an individual line interface circuit might be tolerable, the accumulation of losses (due to the large number of line interface circuits deployed in a single ISLU) significantly impacts the overall efficiency of a central office switch.

Therefore, it is of critical importance to telecommunications service providers to continually enhance the performance of individual line interface circuits.

SUMMARY OF THE INVENTION

It is recognized that an important determinant of the efficiency and reliability of a line interface circuit is related to the stability of a feedback control loop contained within the circuit. The need for stable line interface circuits is addressed and a technological advance is achieved in the art by synthesizing a feedback control loop (circuit) to manipulate the operating phase margin between the battery feed voltage ($V_{BAT}$) and an output voltage ($V_O$) of the line interface circuit. Synthesizing the feedback control circuit requires adjusting feedback control circuit parameters (resistance and capacitance) and an output voltage value of the circuit.

In one embodiment of the present invention, each line interface circuit is equipped with a phase detector for determining the phase angle between $V_{BAT}$ and output voltage $V_O$. The detected phase angle is delivered to a digital signal processor which uses the phase angle to determine if the feedback circuit needs to be resynthesized to adjust the phase angle between $V_{BAT}$ and $V_O$ to approximate a maximum operational stability (a phase angle of forty-five degrees 45°). In another embodiment, a database in the digital signal processor maintains predetermined output voltage values and feedback control circuit resistance and capacitance parameters for optimizing the phase angle between $V_{BAT}$ and $V_O$. Advantageously, equipping the line interface circuit with a phase angle detector and ensuring that the phase margin between $V_{BAT}$ and $V_O$ approximates 45° enables the line interface circuit to operate at optimum stability.

DETAILED DESCRIPTION

Figure 1:
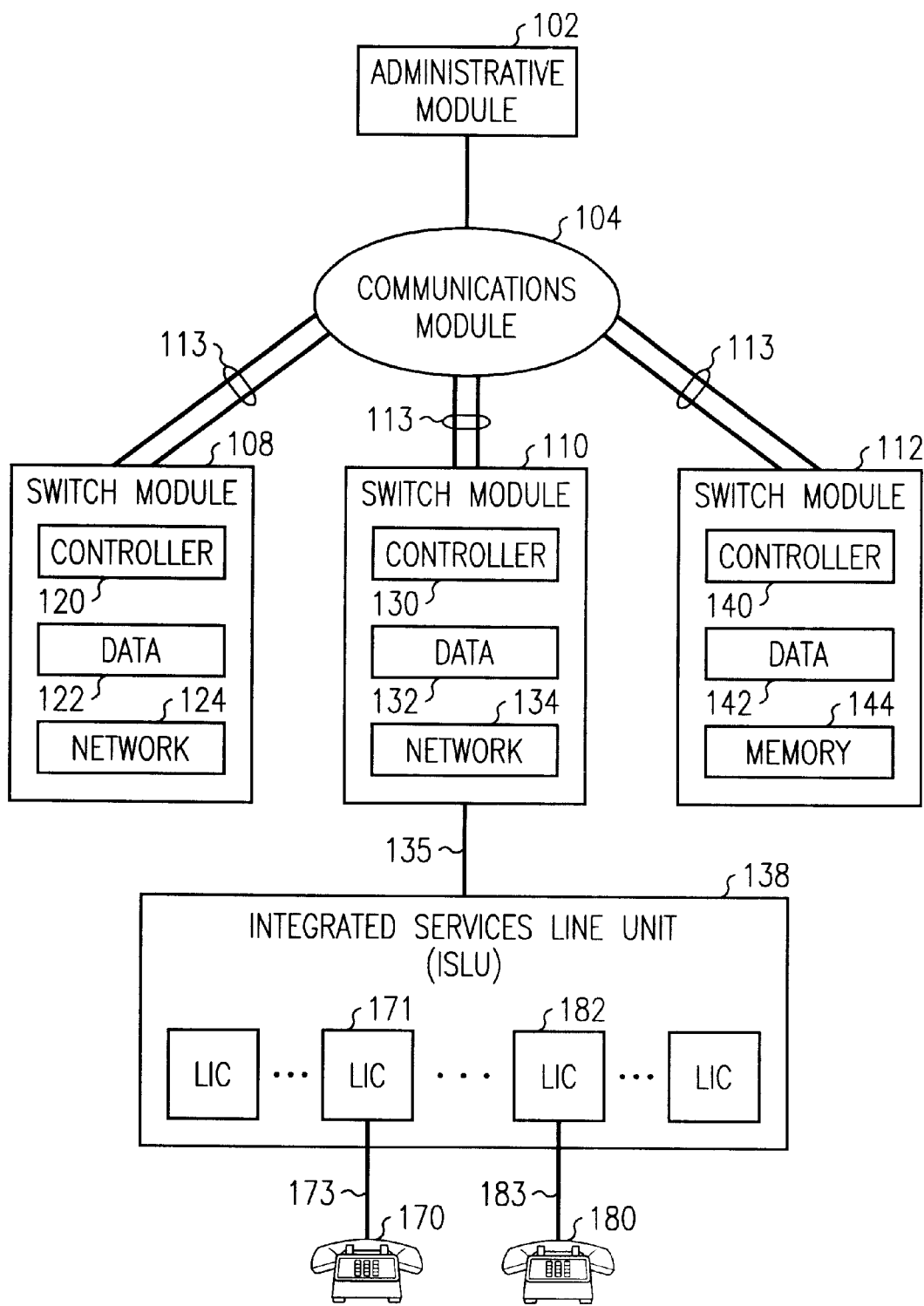
FIG. 1 is a block diagram of a central office switch and in which the present invention may be practiced.

FIG. 1 shows a simplified block diagram of a central office telecommunications switch 100 (hereinafter, switch 100). In the preferred embodiment, switch 100 is the 5ESS® switch manufactured, and sold, by Lucent Technologies Inc. Although a central office switch is shown, any system in which power is supplied to subscriber loops may be utilized.

Switch 100 includes three major components: administrative module 102 for providing system-wide administration, maintenance, and resource allocation; communications module 104 for serving as a distribution hub in switching voice, control information, and synchronization signals; and a plurality of switching modules (SM) 108, 110 and 112 for performing local switching and control functions. Communication among the elements of central office switch 100 is accomplished over network control and timing (NCT) links 113. As required by convention, dual NCT links are shown for the interconnection of each SM to communications module 104.

SMs 108, 110 and 112 include controllers for coordinating switching functions, memory for retaining specific subscriber line data and network elements for routing calls to, and from, individual subscriber lines. In the embodiment shown, switch module 108 comprises controller 120, data memory 122, and network element 124. Similarly, switch module 110 includes controller 130, data memory 132, and network element 134. Switch module 112 comprises controller 140, data memory 142, and network element 144.

Each SM is equipped with an ISLU, also known as an access interface unit (AIU), for interconnecting each subscriber loop to the network element of the SM. Although an operational central office switch includes many ISLUs, a single ISLU is shown clarity. Particularly, ISLU 138, comprised of a plurality of line interface circuits, is interconnected to network element 134 of switch module 110 via link 135. Each subscriber loop served by switch 100 is interconnected to a network element via a particular line interface circuit (LIC) and ISLU. In this example, telephone 170 is interconnected to line interface circuit 171 via subscriber line 173 and telephone 180 is interconnected to line interface circuit 182 via subscriber line 183.

Figure 2:
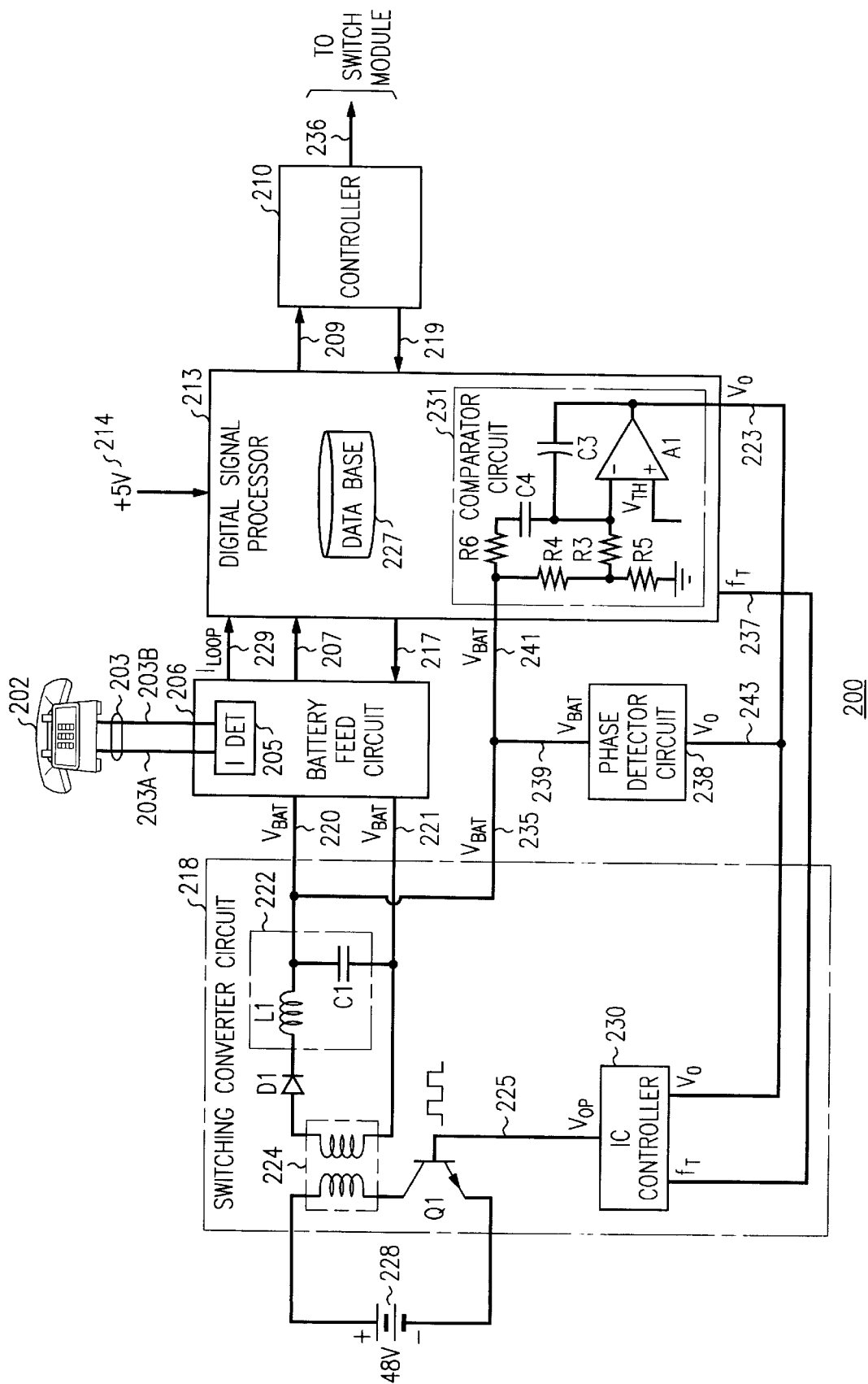
FIG. 2 is a block diagram of a line interface circuit in which the present invention may be practiced.

FIG. 2 is a detailed diagram of a preferred embodiment of a line interface circuit in which the present invention may be practiced. In this embodiment, line interface circuit 200 interconnects telephone 202 to a switch module of a central office switch, such as switch 100. The interconnection of subscriber line 203 to the central office switch enables the detection and transmission of audio signals from telephone 202 to the central office switch. In this example, telephone 202 is interconnected to line interface circuit 200 via subscriber loop 203 comprising "tip" line 203A, and "ring" line 203B. Both tip and ring lines have first ends terminating at telephone 202 and second ends connected to current detector 205 of battery feed circuit 206.

DSP 213 translates audio signals received from telephone 202 via battery feed circuit 206 and link 207 into digital format before delivering these signals to main controller 210 over link 209. Conversely, digital signals received from the switch module via link 219 are converted to analog format prior to delivery to battery feed circuit 206 over link 217. Signals between main controller 210 and the switching module of the serving central office switch are exchanged over signaling link 236.

DSP 213 is powered by five (5) volt power supply 214 and produces output voltage $V_O$. More particularly, DSP 213 receives the loop current ($I_{LOOP}$) associated with subscriber loop 203 from battery feed circuit 206 over link 229. Loop current ($I_{LOOP}$) is equivalent to the current in tip line 203A, or ring line 203B. In the preferred embodiment, the loop current is detected by current detector 205 of battery feed circuit 206 and used to generate threshold voltage $V_{TH}$ and DSP 213 also includes comparator and compensation circuit 231.

Comparator and compensation circuit 231 comprises capacitors C3, C4, resistors R3, R4, R5, R6 and operational amplifier A1. During operation, DSP 213 receives phase angle information about the phase angle between $V_{BAT}$ and $V_O$ from phase detector circuit 238. DSP 213 uses the phase angle information to synthesize comparator and compensation circuit 231 so that output voltage $V_O$ (and thus, the phase angle between $V_{BAT}$ and $V_O$) may be varied. Synthesizing comparator and compensation circuit 231 involves adjusting circuit resistance and capacitance parameters dynamically. Although actual resistors and capacitors are shown in comparator and compensation circuit 231, these elements may be represented in integrated chip form, as is known in the art. Synthesization also requires applying an appropriate threshold voltage value (as determined by DSP 213). More particularly, DSP 213 receives phase angle data from phase detector circuit 238 and calculates an appropriate $V_{TH}$ and synthesizes comparator and compensation circuit 231 to obtain a desired $V_O$. The $V_{TH}$ is applied to the first input of amplifier. The output voltage $V_O$ and comparator and compensation circuit is varied to approximate a phase angle of 45° between $V_{BAT}$ and $V_O$. The new output voltage $V_O$ is then applied to integrated circuit (IC) controller 230 and the process is reiterated until the phase angle between $V_{BAT}$ and $V_O$ reaches optimum stability, or approximates 45°. In the preferred embodiment, the reiterative process occurs a maximum of three (3) times.

In an alternative embodiment, database 227 in DSP 213 stores a table of output voltage and R3, R4, R5, R6, C3 and C4 values which correspond to measured phase angles. In other words, the phase angle between $V_{BAT}$ and $V_O$ (as measured by phase detector 238) is used as an index to database 227 to obtain an appropriate voltage value $V_O$ to be fed to control IC 230. A table of measured phase angles is maintained so that the output voltage and values for R3, R4, R5, R6, C3 and C4 may be automatically derived. If the measured phase angle is not within database 227, DSP 213 can operate in default mode in which and compensation circuit 231 is resynthesized by DSP 213 to maximize stability of the circuit.

Switching converter unit 210 receives power (−48 volts) from external power source 228 to supply voltage to battery feed circuit 206 via links 220 and 221. In the preferred embodiment, the switching converter circuit includes: transformer circuit 224; filter 222; switching transistor Q1; IC controller 230. In this embodiment, transformer circuit 224 is designed to provide voltages ranging from −39.5 volts to −60 volts. Diode D1 rectifies the output of transformer circuit 224, as is known in the art. Filter 222, comprised of conductor L1 and capacitor C1, serves to smooth the output voltage of transformer circuit 224 and to meet ripple requirements. IC controller 230 produces output voltage $V_{op}$ for operating switching transistor Q1, as described below. The operating frequency ($f_T$) of IC controller 230 is supplied by DSP 213 over link 237.

In accordance with the preferred embodiment of the present invention, the feedback control circuit comprises DSP 213 (including comparator and compensation circuit 231), phase detector circuit 238 and IC controller 230. The loop current of subscriber loop 203 is detected by current detector 205 of battery feed circuit 206. The detected loop current is received in digital signal processor 213 via link 229, and is used to determine a threshold voltage value. Upon determination of the threshold voltage ($V_{TH}$) value, digital signal processor 213 uses internal processing to deliver an analog output $V_{TH}$ to comparator and compensation circuit 231.

As known in the art, comparator and compensation circuit 231 uses threshold voltage $V_{TH}$ to produce output voltage $V_O$ which is extended to IC controller 230 over link 223. IC controller 230 uses voltage $V_O$ to produce operating voltage $V_{OP}$. The frequency of operating voltage $V_{OP}$ is controlled by the resistor and capacitor values within comparator and compensation circuit 231. Operating voltage $V_{OP}$ controls the switching frequency of transistor Q1, and therefore determines the value of battery feed voltage $V_{BAT}$. In accordance with the preferred embodiment, $V_{BAT}$ from lead 235 is fed to phase detector circuit 238 via link 239 and to DSP 213 via link 241. Output voltage $V_O$ is delivered to phase detector circuit 238 via links 223 and 243 and to IC controller 230 via link 223. Phase detector circuit 238 measures the phase angle between $V_{BAT}$ and $V_O$ and DSP 213 dynamically synthesizes the comparator circuit so that the phase angle between $V_{BAT}$ and $V_O$ is 45° as described above.

Figure 3:
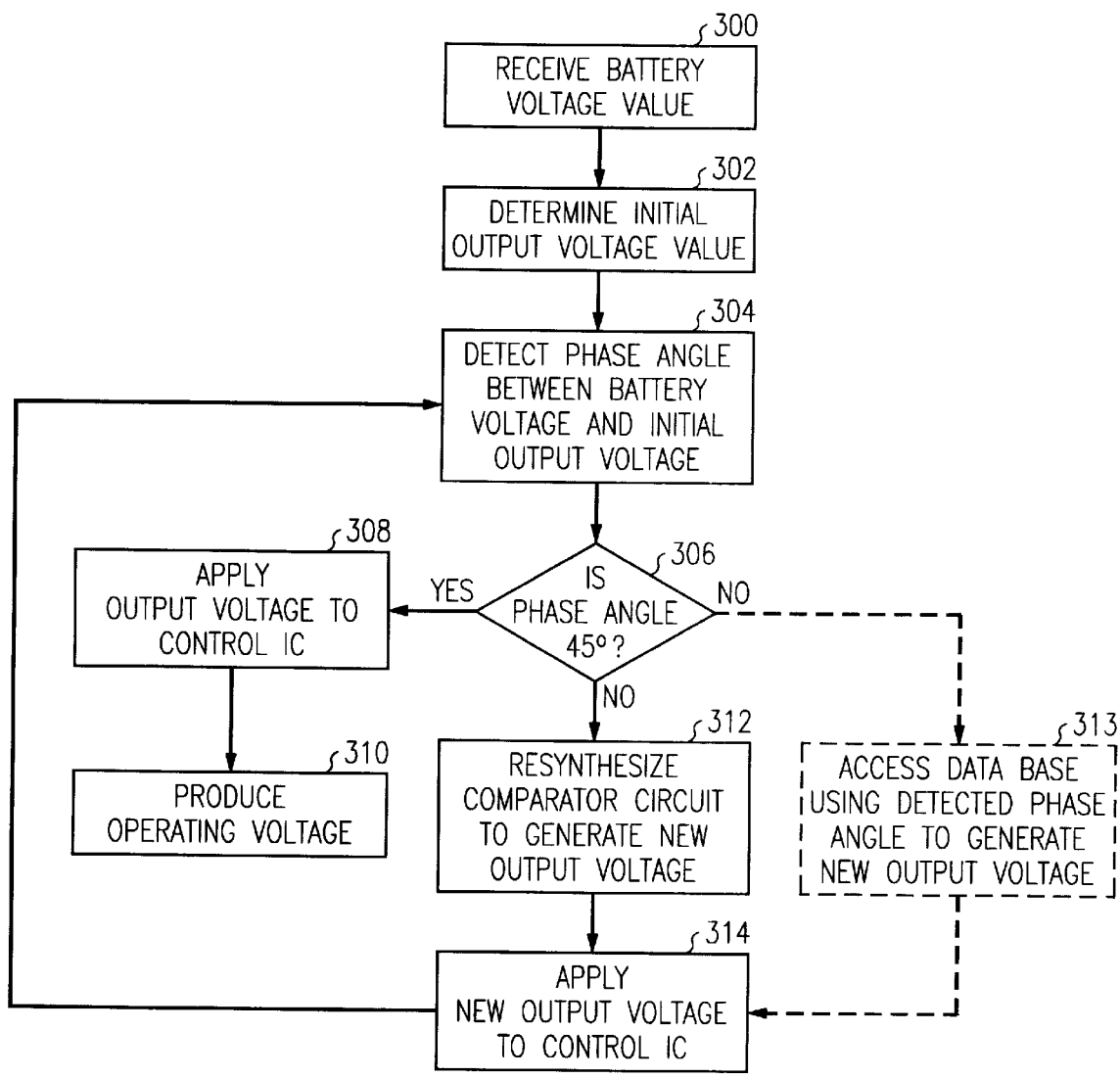
FIG. 3 is a flow diagram of the steps performed in the line interface circuit of FIG. 2 in accordance with the present invention.

FIG. 3 is a flow diagram depicting steps performed in the line interface circuit of FIG. 2 in accordance with the present invention.

The process begins with step 300 in which a value $V_{BAT}$ is received in DSP 213. In step 302, DSP 213 determines an initial $V_O$ value using $I_{LOOP}$. In step 304, phase detector 238 detects the phase angle between $V_{BAT}$ and initial $V_O$. In decision step 306, DSP 213 receives a phase angle detected between $V_{BAT}$ and $V_O$ and determines whether the phase angle is 45° (within a predefined tolerance) If the outcome of decision step 306 is a "NO" decision, the process may proceed to step 312 in which DSP 213 synthesizes comparator circuit 231 to improve the phase angle by generating a new output voltage ($V_O$) value. Alternatively, the process may proceed to step 313 in which DSP 213 uses the phase angle measured by phase detector circuit 238 to access database 227 for generation a new output voltage value as indicated in the database. After step 312 or 313, the process then continues to step 314 in which the new $V_O$ value is applied to IC controller 230. The process then returns to decision step 304 in which the DSP determines if the phase angle between $V_{BAT}$ and the new $V_O$ is 45°. If the outcome of decision step 304 is "NO" again, the DSP resynthesizes comparator circuit 231 to apply another output voltage value to IC controller 230. In the preferred embodiment, DSP 231 resynthesizes the control circuit a maximum of three times before applying a final output voltage value $V_O$ to control IC 230 in step 312. If the outcome of decision step 306 is a "YES" determination, the process continues to step 300 in which the new $V_O$ value is applied to control IC 230. In step 312, phase detector 238 determines the phase between $V_{BAT}$ and the new output voltage, $V_O$. In step 310, control IC 230 produces operating voltage $V_{OP}$ which represents the optimal level of efficiency and stability for line interface circuit 200.

In alternative embodiments, DSP 213 does not synthesize comparator 231 but simply uses the phase angle detected between $V_{BAT}$ and $V_O$ to access information in database 227. In these embodiments, toe detected phase angle serves as an index to database 227 for obtaining an output voltage value $V_O$ and electrical parameters. In the database alternative, there are no iterations or synthesizing of comparator 231 to approximate a 45° angle between $V_{BAT}$ and $V_O$. Instead, it is assumed that the output voltage and electrical parameter values in database 227 represents a precise output needed to approximate a 45° angle between $V_{BAT}$ and $V_O$.

Although this invention has been described with respect to a preferred embodiment, those skilled in the art may devise numerous other arrangements without departing from the scope of the invention as defined in the following claims.

What is claimed is:

1. A method for enhancing the stability of an individual line interface circuit interconnected to a subscriber loop comprises the steps of:

generating a battery voltage;

generating an output voltage;

using a phase detector to determine the phase angle between the battery voltage and the output voltage; and synthesizing a comparator circuit to alter the output voltage so that the phase angle between the battery voltage and the output voltage approaches optimum stability.

2. The method of claim 1 wherein generating a battery voltage comprises:

detecting a loop current of the subscriber loop; and generating a threshold voltage.

3. The method of claim 1 further comprising the step of:

accessing a database to determine an appropriate output voltage so that the phase angle between the output voltage and the battery voltage approaches optimum stability.

4. The method of claim 1 wherein synthesizing a comparator circuit comprises the steps of:

altering parameters associated with the comparator circuit; and applying the altered parameters to generate a new output voltage value.

5. A telecommunications line interface circuit comprises:

a battery feed circuit for transmitting messages between customer premises equipment and a main controller;

a switching converter circuit coupled between a DC power source and the battery feed circuit, the switching converter circuit having an output voltage coupled to the battery feed circuit; and means coupled to the switching converter circuit for determining a phase angle between the battery voltage and the output voltage.

6. The line interface circuit of claim 5 further comprising an alterable circuit for altering the output voltage value so that the phase angle between the battery voltage and the output voltage approximates forty-five degrees (45°).

7. The line interface circuit of claim 5 further comprising a database including a table of various output voltage and electrical parameter values indexed by phase angle between battery voltage and output voltage.

8. A method for enhancing the stability of an individual line interface circuit interconnected to a subscriber loop comprises the steps of:

detecting a loop current of at lease one subscriber loop;

generating a battery voltage and an initial output voltage; and altering, at least one time, the output voltage generated for controlling a phase angle between the battery voltage and the output voltage so that it approximates 45°.

* * * * *